United States Patent [19]

Harmon et al.

[11] 4,041,810

[45] Aug. 16, 1977

[54] TRANSMISSION SHIFT CONTROL DEVICE SYSTEM

[75] Inventors: Kenneth B. Harmon, Indianapolis; Ted M. McQuinn, Carmel, both of Ind.

[73] Assignee: General Motors Corporation, Detroit, Mich.

[21] Appl. No.: 658,399

[22] Filed: Feb. 17, 1976

[51] Int. Cl.² .......................................... B60K 41/14
[52] U.S. Cl. .................................................... 74/868
[58] Field of Search ............... 74/861, 862, 867, 868, 74/871

[56] References Cited

U.S. PATENT DOCUMENTS

| | | | |
|---|---|---|---|
| 3,004,447 | 10/1961 | Sand | 74/868 |
| 3,500,706 | 3/1970 | Oberpichler | 74/868 |
| 3,951,011 | 4/1976 | Lemon | 74/868 |

*Primary Examiner*—Samuel Feinberg
*Attorney, Agent, or Firm*—A. M. Heiter

[57] ABSTRACT

An automatic multiratio drive transmission having an automatic shift control system with a speed and throttle position pressure controlled shift valve controlling shifts between the highest drive ratio and the next lower drive ratio. When the shift valve is in the lower drive ratio position, a normal speed pressure signal increasing with increasing speed acting on the shift valve overcomes an opposing bias force controlled by throttle pressure to upshift the shift valve to the higher drive ratio position at increasing upshift speeds for increased throttle positions and provides an upshift hysteresis force decreasing with increasing throttle positions to prevent shift cycling as the highest ratio is established in a short time period and after a longer time delay period reduces the normal speed related governor pressure in an amount equal to the upshift hysteresis force at full throttle so that the downshift speed is the same as the upshift speed at the full throttle position.

7 Claims, 3 Drawing Figures

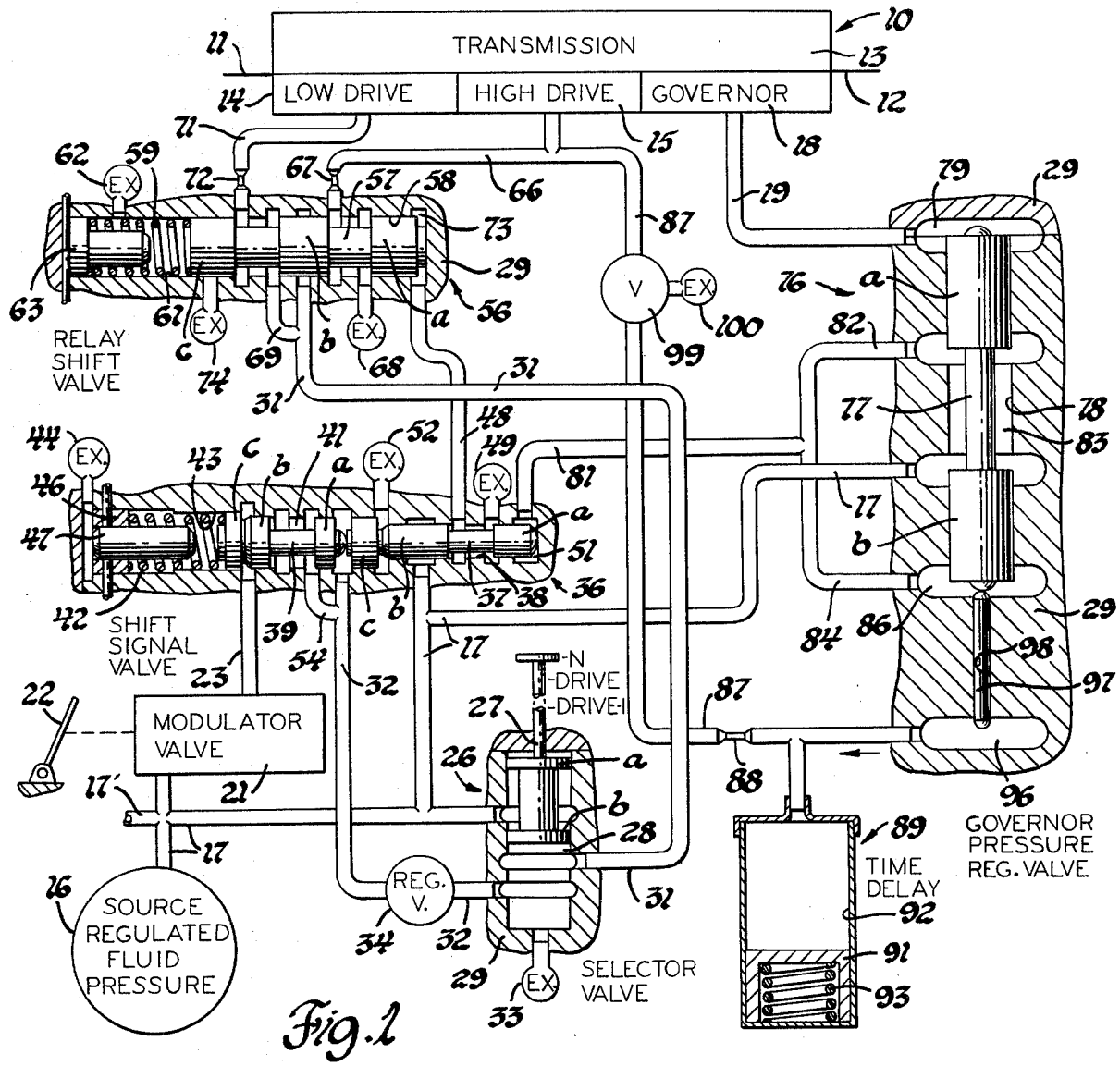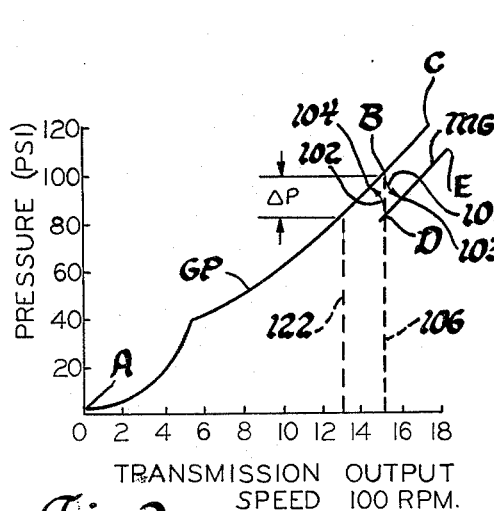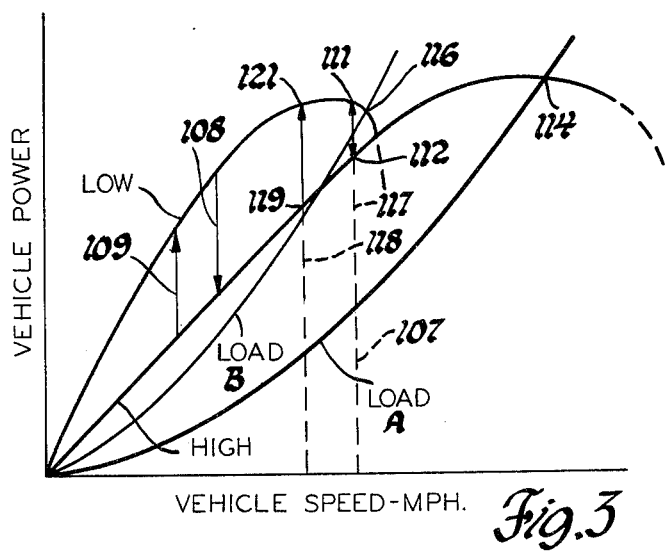

TRANSMISSION SHIFT CONTROL DEVICE SYSTEM

This invention relates to automatic transmissions and particularly automatic speed-responsive shift controls.

BACKGROUND OF THE INVENTION

In conventional automatic shift control systems, output speed and torque demand signals are used to control the automatic shift valves. Such shift valves are biased for upshift by an output speed-responsive governor pressure and biased in a downshift direction by a torque demand, i.e., fuel feed, throttle pedal, vacuum or compressor discharge pressure, downshift bias controlled by a torque demand modulated pressure. On a shift from a low or downshift position to a high or upshift position, the shift valve connects mainline pressure to upshift from a low to a high drive ratio and provides the mainline upshift hysteresis force to ensure completion of the upshift and prevent shift cycling or hunting. These automatic shift valves, on an upshift, provide the upshift hysteresis force by having the mainline pressure connected to the high ratio drive acting on an area of the shift valve and by reducing the torque demand bias. The upshift hysteresis force causes the automatic downshift to occur at a considerably lower downshift speed than the upshift speed. This arrangement is advantageous in vehicles or drives having a low weight or load relative to engine power and an engine in which the response and efficiency is good over a rather wide high speed and power range, because it provides less frequent shifting meeting these drive requirements with an efficient and pleasant drive.

In vehicles or drives having a high weight or load relative to engine power, improved automatic shifting is provided by decreasing the torque demand upshift hysteresis bias with increasing torque demand, as shown in Schaefer U.S. Pat. No. 3,587,355, granted June 28, 1971. In such shift controls, the upshift hysteresis force and thus the speed reduction from the upshift speed that will effect a downshift, are reduced with increasing torque demand. Thus as torque demand and power increase, a downshift is made with decreasing speed reduction from the upshift speed to provide more frequent shifting in response to smaller speed changes for more efficiently matching transmission ratio to meet engine output speed and power characteristics for improved engine and transmission efficiency and improved drive characteristics. The mainline hysteresis provides minimum upshift hysteresis force and thus the minimum difference between upshift speed and downshift speed at full throttle to minimize shift cycling.

SUMMARY OF THE INVENTION

The invention provides substantially reduced or substantially zero hysteresis in an automatic transmission shift control system with a speed and torque demand responsive shift control valve operative in response to increasing speed to effect an upshift from a low ratio drive to a high ratio drive at a predetermined speed which increases with increasing torque demand. The shift valve has a hysteresis system operative in downshift position without hysteresis force and in response to an upshift to provide an upshift hysteresis force effective for a limited time period significantly longer than the shift time period to prevent hunting or shift cycling during normal driving operation. The shift valve hysteresis system has an upshift hysteresis control which is effective on an upshift of the shift valve to provide and maintain an upshift hysteresis force on the shift valve decreasing with increasing torque demand and a downshift hysteresis control effective, after a time delay period after an upshift of the shift valve sufficient to permit complete establishment of the high ratio drive, to provide a downshift hysteresis force substantially equal to the upshift hysteresis force at full torque demand, to provide substantially zero hysteresis and a downshift at a speed substantially equal to the upshift speed at full torque demand. The downshift hysteresis force is provided by reducing governor pressure. On a downshift the upshift hysteresis is discontinued and, after an equivalent time delay providing time for completion of the downshift, the downshift hysteresis force is discontinued to restore operation without hysteresis forces.

The shift valve upshift hysteresis system employs mainline pressure connected to engage the highest ratio drive acting on small valve area to provide the upshift hysteresis force which is normally substantially constant and torque demand pressure acting on a changed area to provide the torque demand upshift force which decreases with increasing torque demand. The upshift hysteresis force acts very quickly in response to shift valve movement during the establishment of the highest drive. The shift valve downshift hysteresis system, when the shift valve is in the downshift position, connects a normal speed-responsive governor pressure to the shift valve to provide the normal speed-responsive upshift bias force. When this speed-responsive bias force upshifts the shift valve against the torque demand downshift bias force, after a sufficient time delay for completion of the high drive engagement, a reduced speed-responsive governor pressure is supplied to the shift valve to provide a reduced speed-responsive upshift bias force. The reduction of governor pressure bias force provides a downshift hysteresis force equal to or slightly less than the upshift hysteresis force to fully, or nearly fully, counteract and thus discontinue the upshift hysteresis force at full torque demand. After the hysteresis force is reduced substantially to zero, the shift valve will downshift at a downshift speed very slightly less than, or the same as, the upshift speed at the full throttle position. Then on a downshift, the upshift hysteresis force is discontinued and the supply of the normal governor pressure to the shift valve is restored after the same type time delay period to discontinue the downshift hysteresis force and restore normal speed and torque demand shifting conditions. The upshift hysteresis force is changed, quickly during an upshift and a downshift time period for completely establishing the new drive, the shift change period, and the downshift hysteresis is changed over a longer limited time delay period, the shift hysteresis period, to reduce shift hysteresis to lower values with increasing torque demand and preferably to zero at full torque demand. The difference between the higher upshift speed and the lower downshift speed decreases with increasing torque demand preferably to zero at full torque demand.

During normal driving operation, when an upshift occurs during vehicle acceleration and a downshift occurs during vehicle deceleration, there is sufficient change of speed from the beginning of the shift change period to the end of the shift hysteresis period to prevent shift cycling. Should vehicle power and the vehicle drive power requirements match to provide steady state drive at the shift speed which would cause shift cycling, the manual control is manually shifted to the low ratio drive hold position or the hysteresis system is manually controlled to disable the downshift hysteresis system so upshift hysteresis is continuously maintained or employed full time after an upshift.

These and other features of the invention are described in more detail in the following specification of a preferred embodiment.

FIG. 1 is a schematic view of the transmission and control system;

FIG. 2 is a plot of governor pressures relative to transmission output speed and showing changes during full throttle shift operation; and FIG. 3 is a plot of vehicle power relative to vehicle speed showing changes for full throttle shifting.

The transmission 10 is a conventional two or more ratio automatic power shift transmission. The transmission may be specifically constructed as a two-speed transmission as shown in the Schaefer U.S. Pat. No. 3,587,355 granted June 28, 1971, and preferably a three-or-more-speed transmission as shown in Schaefer et al. U.S. Pat. No. 3,691,872 granted Sept. 19, 1972.

As shown in FIG. 1, the transmission 10 has an input shaft 11 and output shaft 12 connected by multiratio gearing 13 having a low drive engaging device 14 and a high drive engaging device 15, both of the friction torque establishing type, i.e., a clutch or brake. Since the invention generally relates to shift responsive control or speed governor pressure for an automatic speed and torque demand controlled shift valve, only two ratios have been illustrated in the transmission. In transmissions having more than two ratios, this governor pressure control system is particularly advantageous for, and preferably used only with, the shift valve for shifting between the two highest ratios, such as the 3-4 shift signal valve 358 of the above Schaefer et al. U.S. Pat. No. 3,691,872, for rateless high speed and high performance up-and-down shifting at the same speed with hysteresis only during the shift phase to prevent shift cycling. Since the invention relates primarily to transmission shift controls for shifting between the highest and the next lower ratio drives, only these ratio drives are shown respectively as high ratio drive 15 and low ratio drive 14, but it will be appreciated that other lower ratio drives, lower ratio shift signal valves and lower ratio shift relay valves may be used in a conventional manner, as shown in the above Schaefer et al. U.S. Pat. No. 3,691,872.

CONTROL SYSTEM SOURCE, THROTTLE VALVE AND MANUAL VALVE

The control system (FIG. 1) has a conventional source 16 of regulated fluid pressure conventionally provided by a transmission sump which receives exhaust fluid, leakage fluid, and lubrication return fluid from the controls and transmission gearing, a pump and regulator valve which supplies regulated mainline pressure to mainline 17 of the control system. A mainline branch 17' is conventionally connected to supply the lubrication system (not shown), governor 18 and may supply a conventional torque converter (not shown) in the input drive. The modulator line 23 may be connected to the mainline regulator valve to increase mainline 17 pressure with increasing throttle in accordance with conventional practice. The governor 18, driven by output shaft 12, provides governor pressure proportional to output shaft speed, as indicated by curve GP (FIG. 2), to governor pressure line 19. The mainline 17 is connected to a conventional throttle pedal-actuated throttle modulator valve 21 actuated by throttle pedal 22, such as modulator valve 210 of the above Schaefer et al patent, which supplies throttle modulator or torque demand pressure to modulator line 23. The modulator pressure varies inversely, from a high value to a low value, with the throttle pedal increase of fuel feed on movement from idle to full throttle.

The manual selector valve 26 has a valve element 27 having a recess between equal-diameter lands a and b mounted for movement in bore 28 in valve body 29. The selector valve 26, with the valve element 27 in neutral position as shown, blocks the mainline 17 between its lands and connects drive line 31 and drive-1 line 32 to exhaust 33 at the end of bore 28. When the selector valve element 27 is moved to drive position, the mainline 17 is connected to drive line 31, and drive-1 line 32 remains connected to exhaust 33. When the selector valve element 27 is moved to drive-1 position, the mainline 17 is connected to both the drive line 31 and drive-1 line 32. The regulator valve 34 may be used to regulate drive-1 line 32 pressure at a constant value, lower, i.e., 30 psi, than mainline pressure, i.e., 100 to 150 psi.

SHIFT SIGNAL VALVE

The shift signal valve 36 has a shift valve element 37 having lands a, b, and c located in a stepped bore 38, and a control valve element 39 having lands $a$, $b$, and $c$ in a stepped bore 41. The lands of both valve elements have sequentially increasing diameters from $a$ to $c$, and the bores 38 and 41 in the valve body 29 are stepped to fit the lands. Both valve elements are biased to the downshift position by a spring 42 located in a spring chamber 43 vented by exhaust 44. The spring 42 is seated on an adjustable seat 46 having a stop pin 47 limiting valve movement. In the low or downshift position, shift valve element 37 blocks mainline 17 and connects the shift signal line 48 to exhaust 49. In this position, governor pressure, acting in chamber 51 on the land $a$ of valve element 37, provides the speed-responsive upshift bias force. The torque demand downshift bias force is provided by the downshift direction spring force provided by spring 42 as reduced by modulator force acting in an upshift direction provided by the modulator pressure supplied by line 23 acting on the land $c$ of control valve element 39. When governor and modulator pressures overcome the spring force, or when the speed-responsive governor pressure bias force overcomes the opposing torque demand bias force, the valve elements 37 and 39 upshift. In upshift position, land a of valve element 37 blocks exhaust 49, and mainline 17 is connected to the shift signal valve line 48. The mainline pressure between lands 37a and 37b acts on the excess area of land $b$ relative to the area of land $a$, the mainline or primary hysteresis area, to provide a primary upshift hysteresis force provided by mainline pressure acting on the primary hysteresis area. In addition, modulator pressure also acts on land 39b in addition to acting on land 39c of control valve element 39 to provide a torque demand upshift hysteresis force causing downshift at lower speeds. The sum of the primary upshift hysteresis force and the torque demand upshift hysteresis force is the upshift hysteresis force. The exhaust 52 vents the valve bore between the downshift drive-1 line 32 and mainline 17 and thus vents the step between lands $b$ and $c$ of shift valve element 37 in all positions. Hold downshift or drive-1 pressure in drive-1 line 32 and its branch 54 is connected between the valve elements when in the downshift and upshift position, respectively, to position valve element 37 in a downshift position at porper speeds.

RELAY SHIFT VALVE

The relay shift valve 56 has a valve element 57 having equal-diameter lands a, b, and c located in a bore 58 in valve body 29, and is biased by a spring 59 to low position shown in FIG. 1. The spring 59 is located in chamber 61 vented by exhaust 62 and is seated on a seat and valve stop assembly 63. When valve element 57 is biased to the low position shown by the spring, the high drive line 66, having restriction 67, connects the high drive device 15 between lands 57a and 57b to exhaust 68, and the drive line 31 is connected by branch 69, between lands 57b and 57c, and through low drive line 71, having restriction 72, to low drive device 14 to establish low drive. When shift valve 36 upshifts to supply mainline 17 pressure to shift signal line 48 and chamber 73, the main pressure in chamber 73 acts on land 57a to upshift relay valve element 57 to connect low drive device 14 by low drive line 71 with restriction 72 between lands 57b and 57c to exhaust 74 to disengage the low drive device 14, and connects drive line 31 between lands 57a and 57b through high drive line 66 with restriction 67 to high drive 15 to engage high drive.

GOVERNOR PRESSURE REGULATOR VALVE

The governor pressure regulator valve 76 has a valve element 77 having equal-diameter lands a and b in a bore 78 closed at both ends in body 29. The governor pressure is connected to chamber 79 at one closed end of the bore 78 to act on the end area of land 77a. The modified governor pressure signal line 81, which supplies chamber 51 of shift valve 36, has a control branch 82 connected to bore 78 at the other end of land 77a at the recess 83 between the lands 77a and 77b and a biasing branch line 84 connected to regulated pressure biasing chamber 86 at the opposite closed end of bore 78 to act on the end area of land 77b opposite to the end area of land 77a. A branch 87 of the high drive line 66 is connected to the high drive line downstream of its restriction 67 and is connected through restriction 88 to an accumulator 89 and shift pressure biasing chamber 96. The area of restriction 88 is smaller than the area of restriction 67. The accumulator 89 has a piston 91 in chamber 92 biased by spring 93 in a discharge direction. Then the high drive branch 87 is connected to shift pressure biasing chamber 96 to act on the end of a small-diameter pin or piston 97 slidably sealed in bore 98 in valve body 29 between the chamber 96 and bore 78. The piston 97 and valve element 77 are mounted for coaxial movement. The shift pressure in chamber 96 applies a biasing force to piston 97, and this force is transmitted by piston 97 to valve element 77. A manual hysteresis-type control valve 99 is positioned in high drive line branch 87 between the high drive device and restriction 88 to, in the normal limited-time hysteresis position, connect the high drive device 15 through restriction 88 to accumulator 89 and chamber 96 and block exhaust 100. This manual valve 99 may be moved to a full-time hysteresis position blocking the upsteam portion of branch 87, so pressure in the high drive device 15 is not connected to chamber 96, and connecting the downstream portion of branch 87 to exhaust 100 so chamber 96 and accumulator 89 are connected to exhaust 100 to disable the downshift hysteresis system which reduces governor pressure in high ratio drive.

The mainline 17 supplies mainline pressure at the edge of land 77b at recess 83, which is regulated by the modified governor pressure regulator valve 76 when the transmission is operating in low drive to provide a modified governor pressure signal or a low ratio signal in signal line 81 which is the same as governor pressure in line 19 from point A to point B of the governor pressure curve GP (FIG. 2). In low drive operation only the governor pressure in chamber 79 acting on land 77a and modified governor pressure acting oppositely on the equal-area land 77b bias valve element 77, so the normal or low drive governor pressure is the same as or equal to the governor pressure. When the shift valve means, shift signal valve 36 and relay shift valve 56, upshift to high drive to supply mainline pressure through large restriction 67 and high drive line 66 to high drive device 15 to engage high drive, the high drive branch 87, connected downstream of restriction 67, supplies pressure at the pressure in the high device 15 to smaller restriction 88.

As seen in FIG. 2, restriction 88 and accumulator 89 provide a gradual time-delayed pressure rise in chamber 96 to act on piston 97 to add a bias force to the modified governor pressure bias to provide with time delay the the reduced modified governor pressure MGP, curve D to E, reduced by differential pressure ΔP, relative to governor pressure GP curve B to C. These curves illustrate a shift at full throttle pedal position. As pressure builds up in the high drive device 15, branch 87 and chamber 96, the increase of pressure in chamber 96 is delayed relative to the increase of pressure in the chamber of the high drive device by the restriction 88 and the accumulator 89 connected to high drive line branch 87 downstream of the restriction 88. The accumulator 89 charges as the pressure increases over the pressure range required to engage the high drive device 15 so the accumulator is charged while the high drive device is being engaged and for a limited time period thereafter. The accumulator 89 has sufficient capacity or volume so the charging time or charging continues after high drive is established in the shift period to delay the increase to full mainline pressure of the pressure in chamber 96 relative to the flow and to pressure increase in the high drive device 15, so the modified governor pressure regulation is on upshift time delay curve 101 from point B on curve GP to point 103 on curve MGP. Thus the governor pressure reduction and the shift begin at substantially the same time, and the longer governor pressure reduction time period, e.g., 5 to 7 seconds, does not terminate until after the shift to high and nonslip engagement of the high drive device 15 is completed in the shift time period, e.g., 1 to 1.75 seconds.

On a downshift, the discharge of accumulator 89 must pass through small restriction 88 and will delay reduction of pressure in chamber 89 and thus modified governor pressure on downshift time delay curve 102, from point D on curve MGP to point 104 on curve GP, is relatively slower than the reduction of pressure in high drive device 15 passing through larger restriction 67 and the resulting disestablishment of the high drive device. The delay of the reduction of modified governor pressure on an upshift until the upshift is completed and the delay of the increase of modified governor pressure on a downshift until the downshift is completed avoids shift cycling or hunting during normal operation.

The shift valve 36, during shift movement and until completion of an upshift of the high device 15, has the total upshift hysteresis force at full throttle acting to complete the shift and retain the shift valve 36 upshifted. Then, in response to this completed shift, the normal governor pressure is reduced by a pressure value ΔP, i.e., 17 psi, which when multiplied by the area of land 37a on which normal and modified governor pressures act, will provide a reduction of the governor force equal to, or very slightly less than, the upshift hysteresis force at full throttle for rateless or substantially lower rate shift valve operation. The degree of the reduction of modified governor pressure relative to normal governor pressure is controlled by varying the diameter of the piston 97. The amount of time delay in effecting the reduction of governor signal pressure from the normal governor pressure value delivered to the shift signal valve 36 to the modified governor pressure value primarily depends on the volume of accumulator 89, but also depends on the size of restriction 88 and volume, preferably small, or chamber 96. The shift timing depends on the size of restriction 67 and the change of volume of high drive device 15 during a shift.

OPERATION

While it is believed that the operation is clear from the above description of the components, it seems desirable to summarize the basic operation in a normal sequence of operation. When the engine is started, the source 16 supplies mainline 17 which is connected to supply modulator valve 21 to provide modulator pressure in line 23, governor pressure regulator valve 76 and the shift signal valve 36. When the manual selector valve 26 is in neutral position, drive line 31 and drive-1 line 32 are exhausted by exhaust 33. Both low drive device 14 and high drive device 15 are exhausted and disengaged in both the downshift and upshift positions of the relay shift valve 56 to provide a positive neutral. In the normal standing start, relay shift valve 56, in downshift position shown, connects low drive device 14 by low apply line 71 to exhausted branch 69 and drive line 31 and the high drive device 15 by high apply line 66 to exhaust 68. During coasting, the high drive device 15 and line 66 are connected to exhausted drive line 31, and low drive device 14 is connected to exhaust 74. During normal operation with the manual selector valve 26 in neutral, the throttle pedal 22 is in idle position providing maximum modulator pressure in line 23, and speed governor 18 provides minimum governor pressure to governor pressure regulator valve 76 which, since high apply line 66 and its branch 87 exhaust chamber 96, provides minimum normal governor pressure in modified governor pressure line 81. Under these conditions, shift signal valve 36 will be in the downshift position shown connecting shift signal line 48 to exhaust 49 so the shift relay valve 56 is biased by its spring 59 to the downshift position shown. The modulator valve 21 supplying modulator pressure line 23, governor 18, and governor pressure regulator valve 76 supplying normal governor pressure to governor signal line 81 and mainline 17, are connected to shift signal valve 36 so it is capable of operating and may upshift during coasting.

When the manual selector valve 26 is shifted to drive position, the mainline 17 is connected to the drive line 31. With the shift signal valve 36 and shift relay valve 56 both in downshift position during a normal standing or slow coast speed start, the relay valve 56 connects drive line 31 to low apply line 71 and low drive device 14 to establish low drive. As the throttle pedal 22 is advanced to increase fuel feed, the vehicle speed increases and the governor 18 provides a governor pressure in line 19, increasing with vehicle speed, curve AC, FIG. 2. Since high drive device 15 and its apply line 66 are exhausted, the apply line branch 87 and chamber 96 of the governor pressure regulator valve 76 are exhausted, so the governor pressure regulator valve 76 supplies the normal governor signal to governor signal line 81 and chamber 51 of shift signal valve 36. The shift signal valve element 37 in the downshift position is thus biased in an upshift direction by normal governor signal pressure in chamber 51 providing an upshift normal speed governor bias force and biased in a downshift direction by the torque demand bias which is procided by the downshift bias of spring 42 as reduced or controlled by the upshift bias of inverted modulator pressure, acting on the unbalanced area of land 39c, to provide a torque demand downshift bias directly to fuel feed. Thus, at a predetermined vehicle speed, which increases with increasing torque demand, the shift valve element 37 will upshift to upshift position. The shift valve element 37, which in the downshift position connected shift signal line 48 to exhaust 49 so relay valve 56 was downshifted, in the upshift position connects mainline 17 to shift signal line 48 and chamber 73 to upshift the shift relay valve 56. The upshifted shift relay valve 56 connects low drive device 14 by its apply line 71 to exhaust 74 to disengage low drive and connects drive line 31, which has mainline pressure, to high apply line 66 and high drive device 15 to establish high drive and to apply line branch 87 to supply chamber 96 of the governor pressure regulator valve 76. The large restriction 67 in high apply line 66 controls the rate of engagement of the high drive device 15 for shift quality and smoothness. On an upshift of the shift valve element 37 mainline 17 pressure, connected between lands 37a and and 37b to shift signal line 48, acts on the unbalanced area of land 37b to provide a constant mainline pressure upshift hysteresis force. The control valve element 39 also upshifts, and modulator pressure acts on the larger unbalanced area of both lands 39c and 39b so inverted modulator pressure provides a larger upshift modulator or torque demand bias force acting against the downshift bias of spring 59, so the net torque demand bias force is reduced in decreasing amounts with increasing torque demand. This reduction of net torque demand biasing force, called the upshift torque demand hysteresis, decreases with increasing torque demand to zero at full or maximum torque demand or throttle. The sum of the main pressure upshift hysteresis force and the torque demand upshift hysteresis is the total upshift hysteresis force which provides downshift at a lower speed than the upshift speed at each torque demand value. The difference between these upshift and downshift speeds provided by torque demand hysteresis decreases with increasing torque demand having a large value at idle throttle and decreasing to a minimum or low value at full throttle or torque demand, as explained in the above Schaefer U.S. Pat. No. 3,587,355. The total upshift hysteresis force is sufficiently large at the minimum value at full torque demand to prevent shift cycling or hunting. The total upshift hysteresis force is effective immediately on the upshift of shift valve 36, and the shift from low to high drive is completed in a short shift time period, e.g., 1 to 1.75 seconds, indicated by the vertical line BD (FIG. 2) or 111-112 (FIG. 3).

Simultaneously with the upshift of shift signal valve 36 causing an upshift of the relay valve 56, mainline pressure is supplied through restriction 67 and high apply line 66 to both the high drive device 15 to establish high drive, the fully engaged lock-up drive condition without slip, which occurs over a high drive establishing or shift change time period, and to high apply branch line 87 which controls the governor pressure regulator valve 76. Since the engagement pressure in high drive device 15 supplied by line 87 is connected through restriction 88, which is smaller than restriction 67, to accumulator 89, which is charged as the engagement pressure increases, the control pressure in chamber 96 is gradually increased and modified governor pressure is gradually decreased along curve 101 with time delay relative to the increasing engagement pressure in high drive device 15 over a longer shift hysteresis time period, e.g., 5 to 7 seconds. This reduction of governor signal pressure provides, by the reduction of governor pressure acting on the area of land 37a, a downshift hysteresis force at least equal to a major portion of, and preferably equal to the total upshift hysteresis force, to materially reduce or completely eliminate hysteresis and the speed difference between upshift and downshift speeds at full torque demand value. Since the totel upshift hysteresis force decreases with increasing torque demand, the net hysteresis force, the upshift hysteresis force less the downshift hysteresis force decreases with increasing torque demand to zero at full torque demand. During the high drive establishing time period, fluid in high apply branch line 87 at the same pressure as in high drive device 15 flows through small restriction 88, smaller relative to upstream restriction 67, downstream to both accumulator 89 and chamber 96. The accumulator 89 has a long stroke and high rate for time delay. The restricted supply through restriction 88 initially slowly charges accumulator 89 at a low pressure less than that required to establish any drive at minimal torque demand and sufficiently low so the initial pressure in accomulator 89 and chamber 96 is near zero and slowly rises at a rate less than the pressure rise in high drive device 15 over a governor signal pressure reduction time-delay time period at least as long as, and preferably longer than, the high drive establishing time period at its longest during a high torque demand shift.

This time-delayed gradual rise of pressure to mainline pressure in chamber 96 acts on pin 97 and governor pressure regulating valve element 77 to control regulator valve 76 to gradually reduce regulated governor signal pressure in line 81 from the normal governor signal pressure at the shift, point B, on the normal governor pressure curve AC, FIG. 2, along the gradual time-delayed curve 101 to the reduced modified governor pressure curve DE. The time-delayed governor pressure reduction on curve 101, assuming a normal low to high shift with increasing transmission output and vehicle speed during the time delay to point 103 provides time for increasing reduced governor pressure from point D at the upshift speed to point 103 so the shift signal valve 36 remains in the upshifted position.

Thereafter, when the speed reduces due to increased load at full throttle position, the shift signal valve 36 will downshift under the control of the torque demand bias, and the reduced governor signal pressure at point D on the reduced governor pressure curve DE, FIG. 2, at substantially the same speed as the upshift speed. When the reduced governor pressure downshift hysteresis force is the same as, or slightly less than, the main upshift hysteresis force, the downshift speed is respectively the same as, or slightly less than, the upshift speed. On this downshift, the high drive device 15, high apply line 66 and its branch 87 are connected through large restriction 67 and by shift relay valve 56 to exhaust 68 to disengage high drive in a disengaging time period. The accumulator 89 then discharges and, due to the restricted exhaust flow through small restriction 88, delays the decay or reduction of pressure in chamber 96 and the increase of modified governor pressure for a downshift time delay period. If during such a downshift, the speed continues to decrease slowly, the governor pressure increase will be from point D along curve 102 indicating the time delay, and normal governor pressure will be established at point 104 at a lower speed to establish low drive without shift cycling.

Thus as throttle position increases, normal automatic upshifts are made at predetermined higher output speeds, and drive in the high ratio continues at speeds about the upshift speed. Since the total upshift hysteresis force decreases with increasing throttle position and the downshift hysteresis force is the same as the minimum total upshift hysteresis force at full throttle in all throttle positions, the net upshift hysteresis force decreases from a low value at idle throttle to zero at full throttle. At full throttle if load increases to reduce output speed, a downshift is made at the same speed as the upshift speed so that engine speed and power are not reduced for hysteresis effect and only reduced below the engine speed and power at upshift by the ratio step for maximum performance of the engine and transmission. The upshift and downshift speeds increase with increasing throttle, so after a low throttle upshift at a low speed, increasing throttle will provide a downshift. If output speed increases at constant throttle, there will be an upshift. During normal operation, the throttle pedal 22 position will be varied to provide engine power to match road load at a speed providing one of the ratio drives.

This shift control system provides improved power utilization, as shown in FIG. 3. The conventional illustrative vehicle power curves, LOW, HIGH, LOAD A, and LOAD B, respectively, show the vehicle output power with the transmission in low drive and high drive, and the power required at a selected low and high grade or load relative to vehicle speed. First, considering normal operation where vehicle power is greater than the low load power requirements, curve LOAD A, at full throttle in low ratio drive, the shift control valve will upshift at the upshift speed at maximum low drive power point 111 on the low power curve LOW, as indicated by the upshift line 111-112, to the high ratio drive, as shown by point 112 on the high ratio power curve HIGH. When vehicle power after the upshift in high drive at the shift speed is slightly greater than load power requirements, vehicle speed will increase a little so there will be no shift cycling. With increasing speed, vehicle power will increase on the high ratio power curve, HIGH, to meet the low load power requirement at the stabilization point 114 at the intersection of high ratio power curve, HIGH, with low load requirements curve, LOAD A. When speed decreases in high drive along the high ratio power curve HIGH, to point 112, the transmission will downshift, curve 112-111, at the same speed as the upshift speed. Thus vehicle speed at the downshift with zero net hysteresis is not reduced below the upshift speed. Engine speed is reduced by the ratio step of the gearing as vehicle speed does not change and thus engine power is reduced. Thus with this no hysteresis system, upshifts and downshifts at full throttle occur at the same transmission output speed 106 (FIG. 2), or vehicle speed 107 (FIG. 3). The net upshift hysteresis decreases with increasing torque demand or throttle because its torque demand hysteresis portion decreases with increasing torque demand; the main pressure hysteresis portion is constant, and the downshift hysteresis portion is constant. Thus there is net upshift hysteresis below full throttle. The net upshift hysteresis decreasing with increasing throttle provides a decreasing difference between the higher upshift speed and the lower downshift speed, as illustrated in FIG. 3 by the upshift curve 108 and downshift curve 109, for an intermediate throttle position.

When the vehicle is operating under high power load requirements, curve LOAD B, and in low drive, curve LOW, at full throttle, the upshift will also occur at the same upshift speed, point 111, and shift to high drive, curve 111-112. Since the power output during the low high drive shift, curve 111-112, crosses the high load power requirements, curve LOAD B, the vehicle power delivered in high drive at shift speed, point 112, is less than high load power requirements, curve LOAD B, so vehicle speed in not maintained, and thus tends to decrease. Thus the transmission will shift to high drive and be held in high drive while the net upshift hysteresis force is effective during the hysteresis time-delay period, but at the end of the hysteresis time-delay period, the transmission will downshift. This cycle of upshift and downshift will continue under such steady state conditions, load, throttle, and speed.

When this shift cycling would adversely affect vehicle performance, the low range hold or drive-1 position of manual selector valve 26 may be selected to hold the transmission in low drive for operation on the low drive power curve LOW. In low ratio drive, as the throttle is increased, the power will increase on the low drive power curve, LOW, to meet high load power requirements, curve LOAD B, and operation will be stabilized at point 116 where vehicle power meets or equals load power requirements.

Also, when zero shift hysteresis operation results in shift cycling or too frequent shifting, the manual valve 99 may be moved to the full time hysteresis position to restore upshift hysteresis to the shift valve 36. Then, after an upshift as described above from point 111 to point 112, vehicle speed and power in high drive will decrease on high power curve HIGH to meet load power requirements for stabilized operation at lower power, point 117. If the load power requirement further increases to reduce speed to the hysteresis downshift speed 118, point 119 on high drive power curve HIGH, a downshift will occur from point 119 to point 121 on low drive power curve LOW. The cross-sectional portion between hysteresis upshift curve 111-112, downshift curve 119-121, and the low and high drive vehicle power curves LOW and HIGH, shows the area of increased power during no hysteresis operation. In the no hysteresis shift system, engine speed is reduced by the ratio step on a shift causing a power reduction.

In a hysteresis shift system, after an upshift at upshift transmission output or vehicle speed, e.g., speed 106 (FIG. 2), or 107 (FIG. 3), the downshift will occur at a lower downshift transmission output or vehicle speed, e.g., speed 122 (FIG. 2), or 118 (FIG. 3), which results in a similar reduction of engine speed and power due to the ratio step and a further hysteresis reduction. The no hysteresis shift system makes it possible to avoid the hysteresis reduction of engine speed and power, particularly when such engine speed reduction would cause engine lugging. Where the engine will have acceptable operation at a lower speed, the transmission may have a larger ratio step.

It will be appreciated that the above-described preferred embodiment may be modified.

We claim:

1. In a transmission: multiratio drive means having a low fluid-operated device for establishing a low ratio drive and a high fluid-operated device for establishing a high ratio drive; a source of fluid at regulated pressure; governor means connected to said drive means and providing a governor pressure signal proportional to the speed of said drive means; automatic shift valve means connected to said source, said governor means and said low and high fluid-operated devices, having upshift force hysteresis means and downshift force hysteresis means and normally operative in low position to connect said source to said low fluid-operated device and said high fluid-operated device to exhaust for said low ratio drive and operative in response to said governor pressure signal of increased value to upshift to high position at a predetermined upshift speed to connect said low fluid-operated device to exhaust and to connect said source to said high fluid-operated device for establishing said high ratio drive and in response to said upshift of said shift valve means to actuate said upshift force hysteresis means without time delay to provide an upshift hysteresis force to prevent shift cycling and to actuate said downshift force hysteresis means after a time delay sufficiently longer than the time required for completely establishing said high ratio drive to provide a downshift hysteresis force substantially completely counteracting said upshift hysteresis force acting on said automatic shift valve means after the speed and governor pressure normally increases sufficiently to hold said automatic shift valve means in high drive position and to provide a downshift to said low ratio drive on a subsequent normal speed and governor pressure reduction at a downshift speed substantially the same as said upshift speed.

2. In a transmission: multiratio drive means having a low fluid-operating device for establishing a low ratio drive and a high fluid-operated device for establishing a high ratio drive; a source of fluid at regulated pressure; governor means connected to said drive means and providing a governor pressure proportional to the speed of said drive means; governor regulator valve means connected to said source and said governor means having a pressure-reducing actuator and operative normally in response to increasing governor pressure to provide a low ratio pressure signal similarly increasing with speed and operative during operation of said pressure-reducing actuator to provide a similarly increasing high ratio pressure signal having a reduced value at the same speeds relative to said low ratio pressure signal; and automatic shift valve means connected to said source, said low and high fluid-operated devices, and said governor regulator valve means, having upshift hysteresis means and downshift hysteresis means and normally operative in low position to connect said source to said low fluid-operated device and said high fluid-operated device to exhaust for low ratio drive and operative in response to said low ratio pressure signal of increased value to shift to high position to connect said source to said high fluid-operated device and to connect said low fluid-operated device to exhaust for high ratio drive and to connect said upshift hysteresis means to quickly provide an upshift hysteresis force on said shift valve means and to said pressure-reducing actuator to actuate said pressure-reducing actuator after a time delay to provide said high ratio pressure signal having a reduced value acting on said automatic shift valve means to provide a governor-controlled hysteresis force on said downshift hysteresis means equal to said upshift hysteresis force to provide zero net hysteresis.

3. In a transmission: multiratio drive means having a low fluid-operated device for establishing a low ratio drive and a high fluid-operated device for establishing a high ratio drive; a source of fluid at regulated pressure; governor means connected to said drive means and providing a governor pressure proportional to the speed of said drive means; governor regulator valve means connected to said source and said governor means having a pressure-reducing actuator operative normally in response to increasing governor pressure to provide a low ratio pressure signal similarly increasing with speed and operative during operation of said pressure-reducing actuator to provide a high ratio pressure signal having a reduced pressure value at the same speeds relative to said low ratio pressure signal; and automatic shift valve means connected to said source, said low and high fluid-operated devices, and said governor regulator valve means, having upshift hysteresis means and downshift hysteresis means and normally operative in low position to connect said source to said low fluid-operated device and said high fluid-operated device to exhaust for low ratio drive and operativel in response to said low ratio pressure signal of increased value to shift to high position at a predetermined upshift speed to connect said source to said high fluid-operated device, and to said upshift hysteresis means to quickly provide an upshift hysteresis force on said shift valve means and to said pressure-reducing actuator and to connect said low fluid-operated device to exhaust for establishing high ratio drive while said upshift hysteresis force holds said shift valve means in high position and said pressure-reducing actuator responsive to said pressure from said source after a time delay permitting complete establishment of said high ratio drive to provide said high ratio pressure signal having a reduced value acting on said automatic shift valve means to provide a governor-controlled downshift hysteresis force substantially completely counteracting said upshift hysteresis force normally after the speed and governor pressure increases sufficiently to hold said shift valve means in high position without hysteresis and to provide a downshift to low ratio drive on a subsequent normal speed and governor pressure reduction at a downshift speed substantially the same as said upshift speed.

4. In a transmission: multiratio drive means having a low fluid-operated device for establishing a low ratio drive and a high fluid-operated device for establishing a high ratio drive; a source of fluid at regulated pressure; governor means connected to said drive means and providing a governor pressure signal proportional to the speed of said drive means; torque demand means providing a torque demand pressure signal varying with torque demand; and automatic shift valve means connected to said source, said low and high fluid-operated devices and torque demand means, having upshift force hysteresis means providing an upshift hysteresis force decreasing from a maximum to a low value as torque demand increases from idle to full and downshift force hysteresis means and normally operative in low position to connect said source to said low fluid-operated device and said high fluid-operated device to exhaust for low ratio drive and operative in response to said governor pressure signal of increased value to upshift to high position at a predetermined upshift speed to connect said source to said high fluid-operated device and to connect said low fluid-operated device to exhaust for establishing high ratio drive and to actuate said upshift force hysteresis means without time delay in response to said upshift of said shift valve means to provide an upshift hysteresis force to prevent shift cycling and to actuate said downshift force hysteresis means after a time delay sufficiently longer than the time required for completely establishing said high ratio drive to provide at full torque demand a downshift hysteresis force substantially completely counteracting said upshift hysteresis force acting on said automatic shift valve means after the speed and governor pressure increases sufficiently to hold the automatic shift valve means in high position and to provide a downshift to low ratio drive on a subsequent normal speed and governor pressure reduction at a downshift speed substantially the same as said upshift speed.

5. In a transmission: multiratio drive means having a low fluid-operated device for establishing a low ratio drive and a high fluid-operated device for establishing a high ratio drive; a source of fluid at regulated pressure; governor means connected to said drive means and providing a governor pressure proportional to the speed of said drive means; governor regulator valve means connected to said source and said governor means having a pressure-reducing actuator and operative normally in response to increasing governor pressure to provide a similarly increasing low ratio pressure signal and operative during operation of said pressure-reducing actuator to provide a similarly increasing high ratio pressure signal having a reduced pressure value at the same speeds relative to said low ratio pressure signal; torque demand means providing a torque demand pressure signal varying with torque demand; and automatic shift valve means connected to said source, said low and high fluid-operated devices, said governor regulator valve means and torque demand means, having upshift hysteresis means providing upshift hysteresis force decreasing from a maximum to a low value as torque demand increases from idle to full and downshift hysteresis means and normally operative in low position to connect said source to said low fluid-operated device and said high fluid-operated device to exhaust for low ratio drive and operative in response to said low ratio pressure signal of increased value to shift to high position to connect said source to said high fluid-operated device and to connect said low fluid-operated device to exhaust for high ratio drive and in response to said upshift to operate said upshift hysteresis means to quickly provide an upshift hysteresis force on said shift valve means and to operate said pressure-reducing actuator after a time delay to provide said high ratio pressure signal having a reduced value acting on said automatic shift valve means to provide governor-controlled hysteresis on said downshift hysteresis means having a downshift hysteresis force equal to said upshift hysteresis force at full torque demand to provide zero net hysteresis at full torque demand.

6. In a transmission: multiratio drive means having a low fluid-operated device for establishing a low ratio drive and a high fluid-operated device for establishing a high ratio drive; a source of fluid at regulated pressure; governor means connected to said drive means and providing a governor pressure proportional to the speed of said drive means; governor regulator valve means connected to said source and said governor means having a pressure-reducing actuator operative normally in response to increasing governor pressure to provide a similarly increasing low ratio pressure signal and operative during operation of said pressure-reducing actuator to provide a similarly increasing high ratio pressure signal having a reduced pressure value at the same speeds relative to said low ratio pressure signal varying with torque demand; and automatic shift valve means connected to said source, said low and high fluid-operated devices, said governor regulator valve means and said torque demand means having upshift hysteresis means providing upshift force decreasing from a maximum to a low value as torque demand increases from idle to full and downshift hysteresis means and normally operative in low position to connect said source to said low fluid-operated device and said high fluid-operated device to exhaust for low ratio drive and operative in response to said low ratio pressure signal of increased value to upshift to high position at a predetermined upshift speed to connect said source to said high fluid-operated device and to connect said low fluid-operated device to exhaust for establishing high ratio drive and in response to said upshift to connect said source to said upshift hysteresis means to quickly provide upshift hysteresis force on said shift valve means during said upshift and to said pressure-reducing actuator to hold said shift valve means in high position during said upshift and said pressure-reducing actuator responsive to said pressure from said source after a time delay permitting complete establishment of said high ratio drive to provide said high ratio pressure signal having a reduced value acting on said automatic shift valve means to provide at full throttle a governor-controlled downshift hysteresis force completely counteracting said upshift hysteresis force normally after the speed and governor pressure increases sufficiently to hold said shift valve means in high position without hysteresis and to provide a downshift to low ratio drive on a subsequent normal speed and governor pressure reduction at a downshift speed substantially the same as said upshift speed.

7. The invention defined in claim 6, and said upshift hysteresis means and said downshift hysteresis means providing a net hysteresis force decreasing with increasing torque demand to zero hysteresis at full torque demand so after a time delay said shift valve means is without hysteresis in said high position.

* * * * *

UNITED STATES PATENT AND TRADEMARK OFFICE
CERTIFICATE OF CORRECTION

PATENT NO. : 4,041,810
DATED : August 16, 1977
INVENTOR(S) : Kenneth B. Harmon and Ted M. McQuinn It is certified that error appears in the above-identified patent and that said Letters Patent are hereby corrected as shown below:

Page 1, after "[54]", and Column 1, line 2, change the title to
-- TRANSMISSION SHIFT CONTROL SYSTEM --

Column 5, line 27, before "15" insert -- device --.

Column 6, line 22, before "device" insert -- drive --;
line 59, change the numeral "89" to -- 96 --.

Column 7, line 4, before "device" insert -- drive --.

Column 8, line 21, after "directly" insert -- proportional --.

Column 15, line 17, after "signal" insert -- a semicolon(;) --;
line 18, before "varying" insert -- torque demand means providing a torque demand pressure signal --.

Signed and Sealed this

Third Day of January 1978

[SEAL]

Attest:

RUTH C. MASON
*Attesting Officer*

LUTRELLE F. PARKER
*Acting Commissioner of Patents and Trademarks*